United States Patent [19]
Lueck

[11] 3,780,467
[45] Dec. 25, 1973

[54] FISHING DEVICE
[76] Inventor: Lawrence R. Lueck, P.O. Box 1061, Victorville, Calif. 92392
[22] Filed: Oct. 17, 1972
[21] Appl. No.: 298,335

[52] U.S. Cl................. 43/44.87, 43/44.9, 43/44.99
[51] Int. Cl...................... A01k 93/00, A01k 97/02
[58] Field of Search............... 43/44.87, 44.9, 44.91, 43/44.93, 44.99, 42.06, 131; 119/51, 3

[56] References Cited
UNITED STATES PATENTS
| | | | |
|---|---|---|---|
| 1,729,389 | 9/1929 | Hughett | 43/131 |
| 2,593,524 | 4/1952 | Bechik | 43/44.93 |
| 2,713,744 | 7/1955 | Strausser, Sr. | 43/44.99 |
| 3,337,981 | 8/1967 | Bowman | 43/44.91 |

Primary Examiner—Warner H. Camp
Attorney—John H. Crowe

[57] ABSTRACT

A chum holding bobber which can be attached to a fishing line above a baited hook to distribute chum in the surrounding water for the attraction of fish. The bobber has a round tubular stem with an annular hollow for buoyancy; a chum holding cup, made of lightweight plastic, coaxially affixed to the stem to extend concentrically outwardly and upwardly so that its open side faces up; and a lightweight plastic cup with a larger mouth than the chum holding cup, slidably mounted on the stem above the chum holding cup with its open side down and having a downturned rim with scalloped indentations. The bobber is readied for use by loading the lower, chum holding cup with particulate chum, then sliding the upper cup into contact with the loaded lower cup. The rim or mouth of the chum holding cup nests within the larger mouth of the upper cup, but leaves portions of the scalloped indentations unobstructed to provide openings through which chum particles can escape into the water. A slight tug on the fishing line loosens more of the chum for distribution in the water when this is desired.

10 Claims, 7 Drawing Figures

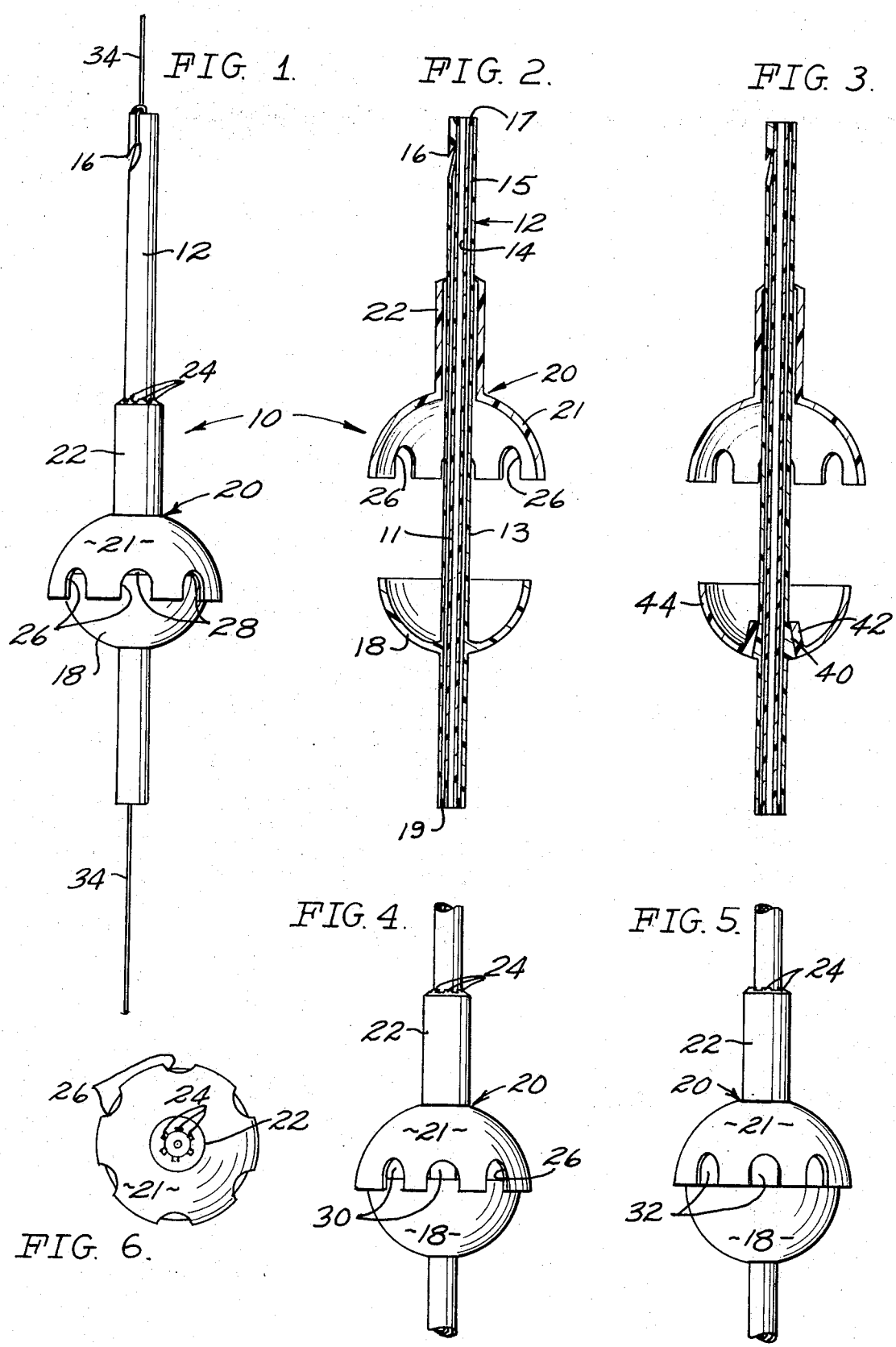

3,780,467

FISHING DEVICE

BACKGROUND OF THE INVENTION

This invention relates generally to fishing tackle, and more particularly to a unique device suitable for use as a float or bobber which serves, at the same time, to release chum in the vicinity of a baited hook for the attraction of fish.

The dispensing of chum in waters being fished to lure fish and thereby increase the likelihood of catching them has long been practiced by fishermen. The simplest way of dispensing chum is to merely toss it into the water by hand, and this is sometimes effective in waters unaffected by strong currents or tides, but where such currents or tides are present, the chum is usually carried away too quickly to serve as such a lure. Attempts have been made to overcome this disadvantage of simple chum broadcasting techniques through the use of devices with chum containers from which the chum can be dispensed by a plunger or narrow brush movable in and out of the chum container through an opening in the bottom of the latter large enough to admit the plunger or brush with just enough clearance to permit escape of some of the chum each time a segment of said plunger or brush is moved from inside the chum container into the surrounding water. Obviously this kind of dispenser can accommodate only very finely divided chum, and it is only operable to distribute the chum when the plunger or brush is jerked in the proper fashion to permit a few particles of the chum to squeeze through the aforesaid opening in its bottom. Another fishing device of which I am aware functions to release a baited hook to a predetermined depth through disintegration of a pellet of chum held together by a water soluble binder. The release of the chum by this prior art device is purely automatic, the only control the fisherman has being his selection of the time for casting the device into the water. Furthermore, the chum particles are fairly finely divided, and obviously immobile (as opposed to live bait), thus ruling out the use of certain types of chum or bait which might be more attractive to particular fish in certain areas.

For universal applicability in the fishing community, a chum-dispensing device should ideally be capable of dispensing particulate chum of a variety of particle sizes and also provide for the fairly constant distribution of chum at a low release rate and the quick release of larger quantities of chum at the fisherman's will, when the occasion demands. No such means has been provided, or even suggested, insofar as I am aware.

SUMMARY OF THE INVENTION

I have now, in the chum-holding bobber of this invention, provided means suitable for use as a float or bobber and, at the same time, being capable of holding, and gradually releasing, a quantity of particulate chum of any of a variety of sizes while yielding to manipulation by the fisherman to release larger amounts of the chum as desired. My float or bobber device is of extremely simple construction, and capable of use by anyone without difficulty, only minimal skill being required for such use. The parts of the bobber device can be easily made from relatively inexpensive materials by wellknown techniques.

The unique chum-releasing float or bobber of this invention has, in its preferred form, a buoyant tubular stem having a hook-like configuration near its upper end for a purpose explained below. This stem has a hemispherical, or cup-shaped, wall extending outwardly and upwardly therearound to define a laterally enclosed space about a lower portion of the stem for holding chum. Slidably mounted on the stem, above the cup-shaped wall around part of its lower portion, is a second hemispherical, or cup-shaped wall, coaxial with said stem, which is movable into and out of contact with the chum holding cup. The upper, slidable or movable cup has a larger mouth than the chum holding cup, so that the mouth or rim of the latter nests within the mouth of the former (movable) cup when that (movable) cup is brought into contact therewith. Preferably, the slidable cup has a concentric sleeve extending upwardly away from the center of its bottom, this sleeve being sized to slide loosely upon the bobber stem. At the upper end of the sleeve is a thin, resilient membrane cut into sectorial segments which bear curvilinearly against the bobber stem to hold the sliding cup assembly in any position to which it is moved therealong. This permits slidable adjustment of the position of the upper (movable) cup on the float stem.

The lower portion of the wall, or skirt, of the slidable cup has a plurality of spaced, relatively deep indentations. When the slideable cup is brought into contact with the chum holding cup, the inner portions of these indentations serve as openings above the rim of the chum holding cup through which chum can escape into the water. The sizes of these openings can be varied by merely backing the upper, slidable cup away from contact with the chum holding cup, to thereby expose larger areas of the identations and increase the sizes of the openings through which the chum can escape. Also, when the upper, slidable cup is backed away from the chum holding cup, there is a narrow annular space between the cups, around the rim of the lower one, through which additional chum can escape, depending upon its particle size.

All parts of my unique float or bobber are preferably made of a lightweight material, or materials, to contribute to the buoyancy of the device. To prepare the bobber for use, a quantity of particulate chum, such as, for example, corn, oatmeal, salmon eggs (where permitted by law), worms, live bait, or the like is loaded into the chum holding cup, and the slidable cup is then moved into contact with the chum holding cup, or close enough thereto to provide the proper size indentation openings for use with the particular chum employed. It will be apparent that chum of large particulate size will require larger openings than more finely divided chum. The bobber is attached to a fishing line by running the line through the hollow center of its tubular stem until the lower end of the line is at the desired hook distance below the water surface. The line is then simply looped under the hook configuration at the top of the stem in such a way that the downbearing weight of the baited line helps to keep the loop tight and hold the bobber at the right position on the line until the hook depth requires readjustment. At such time, the float is moved along the line by simply loosening the loop around its upper hook configuration, sliding the bobber to the desired new position, then reforming the loop around the hook configuration.

The chum holding enclosure formed by the slidable and chum holding cups in the above-described way is preferably situated about the lower half of the bobber stem. Thus, when the line is cast into the water with the bobber attached, the bobber will lie on its side and gradually release bits of the particulate chum through the openings around its chum holding enclosure. When, for any reason, the fisherman desires to release a little more chum, perhaps to attract fish which he has spotted nearby, a gentle tug on the line is sufficient to loosen the chum within the holder and cause a larger quantity to escape through these openings.

It will thus be apparent that my unique chum holding bobber is versatilely adapted to gradually release small or trace quantities of chum in the vicinity of a baited hook, to provide a more or less permanent lure for passing fish, while at the same time being capable of releasing larger quantities of chum, as the occasion demands, through a simple hand manipulation of the tackle on the part of the fisherman. Even a child can easily master the necessary technique fo using the bobber to best advantage under all fishing conditions It is thus a principal object of this invention to provide fishing tackle means suitable for concurrent use as a float or bobber and for the release of chum in the vicinity of a baited hook to attract fish to the bait.

It is another object of the invention to provide such means capable of continuously releasing quantities of chum at a low rate in the vicinity of a baited hook in the water and, at the same time, being responsive to easy hand control for the release of larger quantities of the chum as the occasion demands.

It is still another object of the invention to provide such means adjustable for use with particulate chum of different particle sizes and shapes.

Still another object of the invention is to provide such means of simple and inexpensive construction, readily capable of use by children, and others, as well as by skilled or experienced fishermen.

Other objects, features, and advantages of the invention will become apparent to those skilled in the art in the light of subsequent disclosures herein.

BRIEF DESCRIPTION OF THE DRAWINGS:

FIG. 1 is a side elevation of a preferred form of fishing device in accordance with this invention attached to a fishing line for use.

FIG. 2 is a longitudinal sectional view of the FIG. 1 device removed from the fishing line, and showing separable parts of the device in spaced apart relationship to illustrate its manner of use and functioning.

FIG. 3 is a sectional view, similar to that of FIG. 2, of an alternative embodiment of the invention.

FIG. 4 is a fragmentary side elevation of the FIG. 1 device, showing said separable parts in different relative positions by comparison with their FIG. 1 positions.

FIG. 5 is a fragmentary elevational view, similar to the FIG. 4 view, but showing the separable portions of the device in still another positional relationship.

FIG. 6 is a top view of the FIG. 1 device separated from the fishing line shown in the latter Figure.

DESCRIPTION OF PREFERRED EMBODIMENTS

Figure 7:
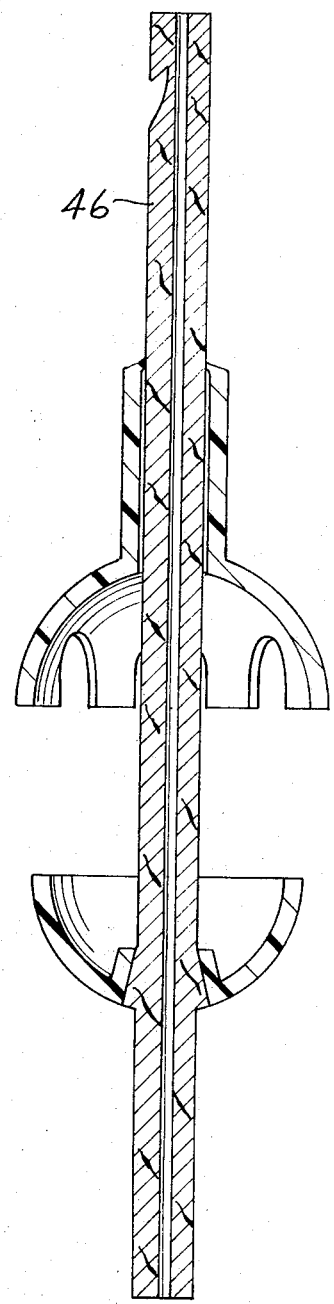
FIG. 7 is a longitudinal sectional view, drawn to an enlarged scale, of a second alternative form of fishing device in accordance with my invention.

Considering now the drawing in greater detail, there is shown generally at 10, in FIGS. 1 and 2, a preferred embodiment of a float or bobber device in accordance with this invention. Bobber 10 has a buoyant, tubular stem 12 with a hollow center, as shown at 14, characterized by the presence of a hook configuration 16 near its upper end. Stem 12 preferably has a length of about nine inches, although this is not critical and the stem could be of any length suitable for the purpose, such as, for example, 6 inches. Stem 12 is constructed from a pair of relatively thin-walled, concentrically arranged tubes 11 and 13 defining an annular space 15 enclosed at its ends by annular enclosures 17 and 19. The stem is preferably formed from a lightweight plastic of any type known to those skilled in the art to be suitable for the purpose. The annular space 15 of stem 12 provides the necessary buoyancy for bobber 10 and is of the same cross-sectional size and shape throughout, except in the vicinity of hook configuration 16 where this is, of course, impossible.

Integral with stem 10, so as to extend outwardly and upwardly therefrom, around a portion of its lower half, is a hemispherical, cup-shaped wall 18 which defines a laterally enclosed space for chum, as will be seen. Slidably mounted on the stem, above the cup shaped configuration 18, hereinafter referred to as chum cup 18, is a slidable member 20. Slidable member 20 consists of an integral, downwardly facing cup 21, with a concentric buttom opening, and a cylindrical sleeve 22, adapted to fit loosely on stem 12, extending upwardly from around the concentric opening in the bottom of cup 21. Sleeve 22 has, extending inwardy from the mouth of its upper rim, a plurality of friction tabs 24, formed from a thin, resilient material, which bear curvilinearly against stem 12 to provide frictional resistance to slipping movement of member 20 therealong. The frictional resistance is adequate to hold member 20 in any position to which it is moved along stem 12, yet of insufficient strength to prevent easy sliding of that member along the stem by anyone, even a child. Similarly to stem 12, the remaining parts of bobber 10 are preferably made of lightweight plastic. Many such plastics are known to those skilled in the art, hence need not be discussed in detail here. Friction tabs 24 could be made from the same material as the remaining parts of sliding member 20, or of a different material selected for its friction-holding and/or other characteristics.

As will be apparent, sliding member 20 is movable along stem 12 between positions of contact with the chum holding cup 18, as shown in FIG. 1. and positions of varying distance from the chum holding cup, FIG. 2 showing its farthest distance away from the latter.

The hook configuration 16 near the upper end of stem 12 of bobber 10 permits easy fastening of the bobber to a fishing line at any desired distance above a baited hook. This is accomplished by running the line, such a line being shown at 34 in FIG. 1, through the hollow interior 14 of stem 12 to the desired bait depth, and then looping the line around the hook configuration in the manner illustrated in FIG. 1. The weight of the baited line below the bobber will hold the loop tight at the upper end of stem 12, and when it is desired to vary the position of the bobber on the line, this is easily accomplished by loosening said loop by hand, and sliding the bobber along the line to the new position, then again looping the line around hook configuration 16.

Downwardly facing cup 21 of the slidable member 20 has a plurality of scalloped indentations 26 around its lower wall, or skirt. Cup 21 is of larger diameter than chum holding cup 18 so that the latter nests within the mouth of the former, when member 20 is pushed into contact with cup 18, in the manner illustrated in FIG. 1. The indentations 26 are of sufficient depth so that full contact between cup 21 and the chum holding cup 18 does not bring the rim of cup 18 past their bottom ends. Thus, small openings, as shown at 28 in FIG. 1, are provided around the side of the enclosure formed by the mating cups 21 and 18, when these cups are in contact. The backing away of slidable member 20 from cup 18 causes these openings to enlarge, as illustrated in FIG. 4, which shows larger openings at 30, and in FIG. 5, which shows still larger openings at 32. Openings 32 correspond to the largest size openings possible, since further backing away of slidable member 20 causes complete separation of the two cups, and FIG. 4 shows openings intermediate in size between those of FIG. 5 and the smallest openings of FIG. 1.

To prepare bobber 10 for use, the slidable member 20 is backed away from cup 18 far enough to permit a quantity of chum to be placed in the latter. Slidable member 20 is then pushed into contact with cup 18, or to a position which provides the desired opening sizes (such as its position in FIG. 4 or FIG. 5) for the particular chum employed. Generally, the smaller the particle, size of the chum, the smaller will be the desired openings. As previously indicated, the chum can be of any particulate variety where the particles are shaped or sized to fit into cup 18, and can thereafter escape through the openings around the enclosure formed by cups 18 and 21. The line to which the bobber is attached is then cast into the water, where the bobber lies on its side on the water surface. Particles of chum work their way out through the openings in the nested cups, and drift downwardly in the vicinity of the baited hook. When the fisherman has occasion to feel that the release of more chum would be desirable, he merely tugs or pulls on the line, to jostle the chum in the nested cups, and cause more chum to pass outwardly through said openings.

FIG. 3 shows an alternative form of the bobber, similar to that of FIG. 1 except that the chum holding cup is formed separately from the bobber stem, with an upthrust central wall having a frustoconical socket which fits against a mating frustoconical seat on the stem. The chum holding cup is shown at 44 in FIG. 3, and its upthrust central well at 42. The frustoconical seat around the stem is shown at 40. Cup 44 can be pressed downwardly into friction fitting contact with the seat 40 on the stem, or it can be permanently affixed to the seat by means of a suitable adhesive. The advantage of this form of bobber over that shown in FIG. 1 is a greater ease and lower cost of manufacture, as well as greater simplicity of construction.

Still another form of my unique bobber is shown in FIG. 7, this one differing from the FIG. 3 bobber in having a stem formed of solid wood, rather than hollow plastic, as in the latter. This stem is shown at 46, and can be made of any suitable wood, the only requirement being that the wood be of light enough density of impart buoyancy to the bobber.

While the novel chum holding and distributing bobber of this invention has been illustrated and described in what I consider to be the preferred embodiment thereof, it will be understood by those skilled in the art that various departures may be made therefrom within the scope of the invention. Some of these departures have already been mentioned, and others will occur to those skilled in the art in the light of present teachings. In summary, the scope of the present invention extends to all variant forms thereof encompassed by the language of the following claims.

I claim:

1. Chum holding bobber means fastenable to a fishing line above a baited hook comprising, in combination:

buoyant stem means;

first cup-shaped means adapted for positioning, open side up, on said stem means to provide a laterally enclosed space around the stem means for suitably receiving a quantity of particulate chum;

second cup-shaped means adapted to be positioned, open side down, above the first cup-shaped means on said stem means; and friction holding means cooperatively associated with said second cup-shaped means adapted to permit slidable movement of the latter along said stem means and to hold the second cup-shaped means in any position to which it is moved along the stem means, so that the second cup-shaped means can be easily positioned in or out of contact with the first cup-shaped means along said stem means;

the downturned mouth of said second cup-shaped means being larger than the upturned rim of the first cup-shaped means and the geometric relationship thereof being such that the rim of the first cup-shaped means nests within the mouth of the second cup-shaped means when the latter is brought into sliding contact with the former along said stem means;

the second cup-shaped means having scalloped indentations around its mouth of such size that portions remain as openings in the wall of said second cup-shaped means when it is brought into sliding contact with said first cup-shaped means along said stem means, which openings can be enlarged by backing of the second cup-shaped means away from its first cup-shaped means, whereby particulate chum loaded into said first cup-shaped means can escape through said openings into the water when the bobber is in use on a fishing line to attract fish to the vicinity of the baited hook.

2. Chum holding bobber means in accordance with claim 1, in which said buoyant stem means has a central longitudinal hollow through which a fishing line can be threaded and a hook-like configuration near its upper end around which the line can be looped to fix the bobber means in position thereon to assure retention of the bobber means in place at a predetermined level above a baited hook on said line when said bobber means is so affixed to said line at said predetermined level.

3. Chum holding bobber means in accordance with claim 2, in which said stem means is formed from a pair of plastic cylinders of round cross-section and differing diameters concentrically arranged to define an annular space therebetween, the upper and lower ends of said annular space being sealed against water leakage to impart buoyancy to the stem means.

4. Chum holding bobber means in accordance with claim 3, in which each of the first and second cup-shaped means is of generally hemispherical shape.

5. Chum holding bobber means in accordance with claim 4, in which said stem means and said first cup-shaped means have cooperating male and female frustoconical surfaces adapted to permit mating of the stem means and first cup-shaped means at said frustoconical surfaces.

6. Chum holding bobber means in accordance with claim 5, in which said stem means and said first cup-shaped means are fastened tightly together by adhesive means between said frustoconical surfaces.

7. Chum holding bobber means in accordance with claim 2, in which said stem means is of round cross-section, and formed from soft wood of a buoyant character.

8. Chum holding bobber means in accordance with claim 4, in which each of the first and second cup-shaped means is of generally hemispherical shape.

9. Chum holding bobber means in accordance with claim 8, in which said stem means and said first cup-shaped means having cooperating male and female frustoconical surfaces adapted to permit mating of the stem means and first cup-shaped means at said frustoconical surfaces.

10. Chum holding bobber means in accordance with claim 9, in which said stem means and said first cup-shaped means are fastened tightly together by adhesive means between said frustoconical surfaces.

* * * * *

UNITED STATES PATENT OFFICE
CERTIFICATE OF CORRECTION

Patent No. 3,780,467          Dated December 25, 1973

Inventor(s)   LAWRENCE R. LUECK

It is certified that error appears in the above-identified patent and that said Letters Patent are hereby corrected as shown below:

Column 3, line 17, "fo" should read --for--. Column 7, line 12, "4" should read --7--. Column 8, line 4, "having" should read --have--.

Signed and sealed this 9th day of April 1974.

(SEAL)
Attest:

EDWARD M.FLETCHER,JR.
Attesting Officer

C. MARSHALL DANN
Commissioner of Patents